United States Patent
Cai et al.

(10) Patent No.: US 9,071,959 B2
(45) Date of Patent: Jun. 30, 2015

(54) SERVICE AWARENESS AND SEAMLESS SWITCHOVER BETWEEN CLIENT BASED WIFI ACCESS AND MOBILE DATA NETWORK ACCESS

(71) Applicant: International Business Machines Corporation, Armonk, NY (US)

(72) Inventors: Yan Cai, Shanghai (CN); Canio Cillis, Berlin (DE); Ting Ding, Beijing (CN); Ekkart Leschke, Berlin (DE); Biao Long, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 13/772,443

(22) Filed: Feb. 21, 2013

(65) Prior Publication Data

US 2014/0233400 A1   Aug. 21, 2014

(51) Int. Cl.
*H04W 4/24*   (2009.01)
*H04W 28/02*   (2009.01)

(52) U.S. Cl.
CPC ............ *H04W 4/24* (2013.01); *H04W 28/0247* (2013.01)

(58) Field of Classification Search
None
See application file for complete search history.

(56) References Cited

U.S. PATENT DOCUMENTS

| | | | |
|---|---|---|---|
| 7,136,651 B2 | 11/2006 | Kalavade | |
| 8,078,164 B2 | 12/2011 | Genesan | |
| 8,862,869 B1* | 10/2014 | Soon | 713/153 |
| 2005/0013280 A1* | 1/2005 | Buddhikot et al. | 370/349 |
| 2005/0025164 A1* | 2/2005 | Kavanagh et al. | 370/401 |
| 2006/0014539 A1* | 1/2006 | Oh | 455/436 |
| 2006/0153124 A1 | 7/2006 | Kant et al. | |
| 2008/0101391 A1 | 5/2008 | Au et al. | |
| 2008/0117884 A1* | 5/2008 | Ishii et al. | 370/338 |
| 2008/0316970 A1 | 12/2008 | Choi | |
| 2009/0137222 A1* | 5/2009 | Heen | 455/404.1 |
| 2010/0188994 A1 | 7/2010 | Raleigh | |
| 2010/0192212 A1 | 7/2010 | Raleigh | |
| 2011/0022702 A1* | 1/2011 | Riley et al. | 709/224 |
| 2011/0320620 A1 | 12/2011 | Cutler et al. | |
| 2012/0246325 A1* | 9/2012 | Pancorbo Marcos et al. | 709/227 |
| 2013/0138823 A1* | 5/2013 | Centemeri et al. | 709/228 |
| 2013/0242783 A1* | 9/2013 | Horn et al. | 370/252 |

(Continued)

OTHER PUBLICATIONS

Cisco Whitepaper, "Architecture for Mobile Data Offload over Wi-Fi Access Networks", Apr. 2012.

(Continued)

*Primary Examiner* — Ayaz Sheikh
*Assistant Examiner* — Peter Chau
(74) *Attorney, Agent, or Firm* — Martin & Associates, LLC; Bret J. Petersen

(57) ABSTRACT

A system and method provides seamless switchover of a user device (UE) between a mobile data network and a wireless network while providing policy and charging control (PCC) of the data session in the mobile data network. A mobile core network component is made ASF aware to process user data traffic related to an auto switching function (ASF) server from a UE client located on the UE using a special access point name (APN). The mobile core network component then uses a dedicated deep packet inspection (ASF DPI) for all data transfers to the special APN. The core network component is then able to process the UE data traffic seamlessly as the traffic is toggled between the ASF tunnel the WiFi tunnel. By monitoring the data traffic on the ASF tunnel, the core component (GGSN/PGW) is able to provide PCC for the data session.

10 Claims, 6 Drawing Sheets

(56) References Cited

U.S. PATENT DOCUMENTS

| | | | |
|---|---|---|---|
| 2013/0242965 A1* | 9/2013 | Horn et al. | 370/338 |
| 2013/0288644 A1* | 10/2013 | Schroeder et al. | 455/411 |
| 2014/0010085 A1* | 1/2014 | Kavunder et al. | 370/235 |
| 2014/0105007 A1* | 4/2014 | Pathmasuntharam et al. | 370/230 |
| 2014/0126532 A1 | 5/2014 | Bapat et al. | |

OTHER PUBLICATIONS

Republic Wireless, How It Works, www.republicwireless.com/how-republic-works, printed Jan. 14, 2013.

* cited by examiner

SERVICE AWARENESS AND SEAMLESS SWITCHOVER BETWEEN CLIENT BASED WIFI ACCESS AND MOBILE DATA NETWORK ACCESS

BACKGROUND

1. Technical Field

This disclosure generally relates to mobile data systems, and more specifically relates to a mobile data network with integrated WiFi offload to provide user equipment with seamless switchover between WiFi access and mobile data network access in a manner that is service aware and compliant with existing mobile data network functions.

2. Background Art

Mobile phones have evolved into "smart phones" that allow a user not only to make a call, but also to access data, such as e-mails, the internet, etc. Mobile phone networks have evolved as well to provide the data services that new mobile devices require. For example, 3G networks cover most of the United States, and allow users high-speed wireless data access on their mobile devices. In addition, phones are not the only devices that can access mobile data networks. Many mobile phone companies provide equipment and services that allow a subscriber to plug a mobile access card into a Universal Serial Bus (USB) port on a laptop computer, and provide wireless internet to the laptop computer through the mobile data network. In addition, some newer mobile phones allow the mobile phone to function as a wireless hotspot, which supports connecting several laptop computers or other wireless devices to the mobile phone, which in turn provides data services via the mobile data network. As time marches on, the amount of data served on mobile data networks will continue to rise exponentially.

Mobile data networks include very expensive hardware and software, so upgrading the capability of existing networks is not an easy thing to do. It is not economically feasible for a mobile network provider to simply replace all older equipment with new equipment due to the expense of replacing the equipment. To reduce data loading on mobile networks, mobile network providers are beginning to use various methods to offload network traffic from the mobile network. One method to offload data is to offload to a wireless local area network (WLAN), often referred to as a WiFi network, when a WiFi network is available. The various client based WiFi offloading techniques have problems such as supporting seamless switchover while providing policy based billing and quality of service (QoS) handling.

WiFi networks can be categorized as trusted or untrusted networks. A trusted network is typically one that is owned by a carrier and integrated into the carrier's mobile data network. An untrusted network is one that is not owned and integrated by a carrier. A WiFi network can charge a user for access to the network. This is typically done through a login to charge for the service or by recognizing a subscriber identity module (SIM) on the user's device. The WiFi network typically is not able to provide policy and charging control (PCC) on a packet basis for the data provided to the user over the WiFi network. The WiFi network typically is not integrated into a policy control point such as the policy and charging rules function (PCRF) of the mobile data network or to provide these services. Another drawback of WiFi offloading is seamless session mobility. A WiFi session is typically broken when the user moves away from the WiFi access point or hotspot.

BRIEF SUMMARY

Described herein is a system and method for providing seamless switchover of user equipment (UE) between a mobile data network and a wireless network while providing service aware and policy and charging control (PCC) of the data session in the mobile data network. A mobile data core network component is made auto switching function (ASF) aware to process user data traffic related to an server from an ASF related UE client located on the UE. The UE client opens a PDP context with a special access point name (APN) for data to be transferred through the mobile data core network component to the ASF server on an ASF tunnel based on GPRS Tunneling Protocol User Plane (GTP-U). The ASF server and the UE client together determine whether to use the ASF tunnel on the mobile data network or a WiFi tunnel on the WiFi network. The mobile core network component then uses a dedicated deep packet inspection (DPI) for all data transfers via the special APN. By monitoring the data traffic on the ASF tunnel, the mobile core component (GGSN/PGW) is able to provide service aware PCC for the data session as the UE moves from the WiFi network to the mobile data network. The UE client is then able to process the UE data traffic seamlessly as the traffic is toggled between the ASF tunnel and the WiFi tunnel.

The claims herein are directed to multiple generations of mobile data systems. In a second or third generation (2G/3G) mobile data system, the core network component is the Gateway GPRS (general packet radio service) Support Node (GGSN). In long term evolution or 4$^{th}$ generation (LTE/4G) mobile data system, the core component may be the Packet Data Network Gateway (PGW). The majority of the description herein will address the 2G/3G architecture, however, it will be assumed that any reference herein to a GGSN core network component will also refer to a PGW in an LTE/4G system. Of course, one of ordinary skill in the art will readily appreciate the concepts herein can also be applied to future implementations of mobile data networks that are not currently known.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 1 is a block diagram of a prior art mobile data network;

FIG. 2 is a block diagram of a mobile data network that provides service awareness and seamless switchover of a UE between a mobile data network and a wireless network;

FIG. 3 is a block diagram that provides additional detail of the mobile data network shown in FIG. 2;

FIG. 4 is a flow diagram that illustrates the setup communication for a first packet of data to setup for service awareness and seamless switchover;

FIG. 5 is a flow diagram of a method for service awareness and seamless switchover in a mobile data network with a breakout system; and FIG. 6 is a block diagram of an LTE/4G mobile data network that provides service awareness and seamless switchover of a UE between a mobile data network and a wireless network.

DETAILED DESCRIPTION

The claims and disclosure herein provide mechanisms and methods for seamless switchover of user equipment (UE)

between a mobile data network and a wireless network while providing service aware policy and charging control (PCC) of the data session in the mobile data network. A mobile data core network component is made auto switching function (ASF) aware to process user data traffic related to an ASF server from a UE client located on the UE. The UE client opens a PDP context with a special access point name (APN) for data to be transferred through the mobile data core network to the ASF server on an ASF tunnel based on GPRS Tunneling Protocol User Plane (GTP-U). The ASF server and the UE client together determine whether to use the ASF tunnel (GTP U included) on the mobile data network or a WiFi tunnel on the WiFi network. The mobile core network component (GGSN/PGW) then uses a dedicated (ASF protocol specific) DPI for all data transfers via the special APN. By monitoring the data traffic on the ASF tunnel, the mobile core network component (GGSN/PGW) is able to provide service aware PCC for the data session as the UE moves from the WiFi network to the mobile data network. The UE client is then able to process the UE data traffic seamlessly as the traffic is toggled between the ASF tunnel the WiFi tunnel.

Figure 1:
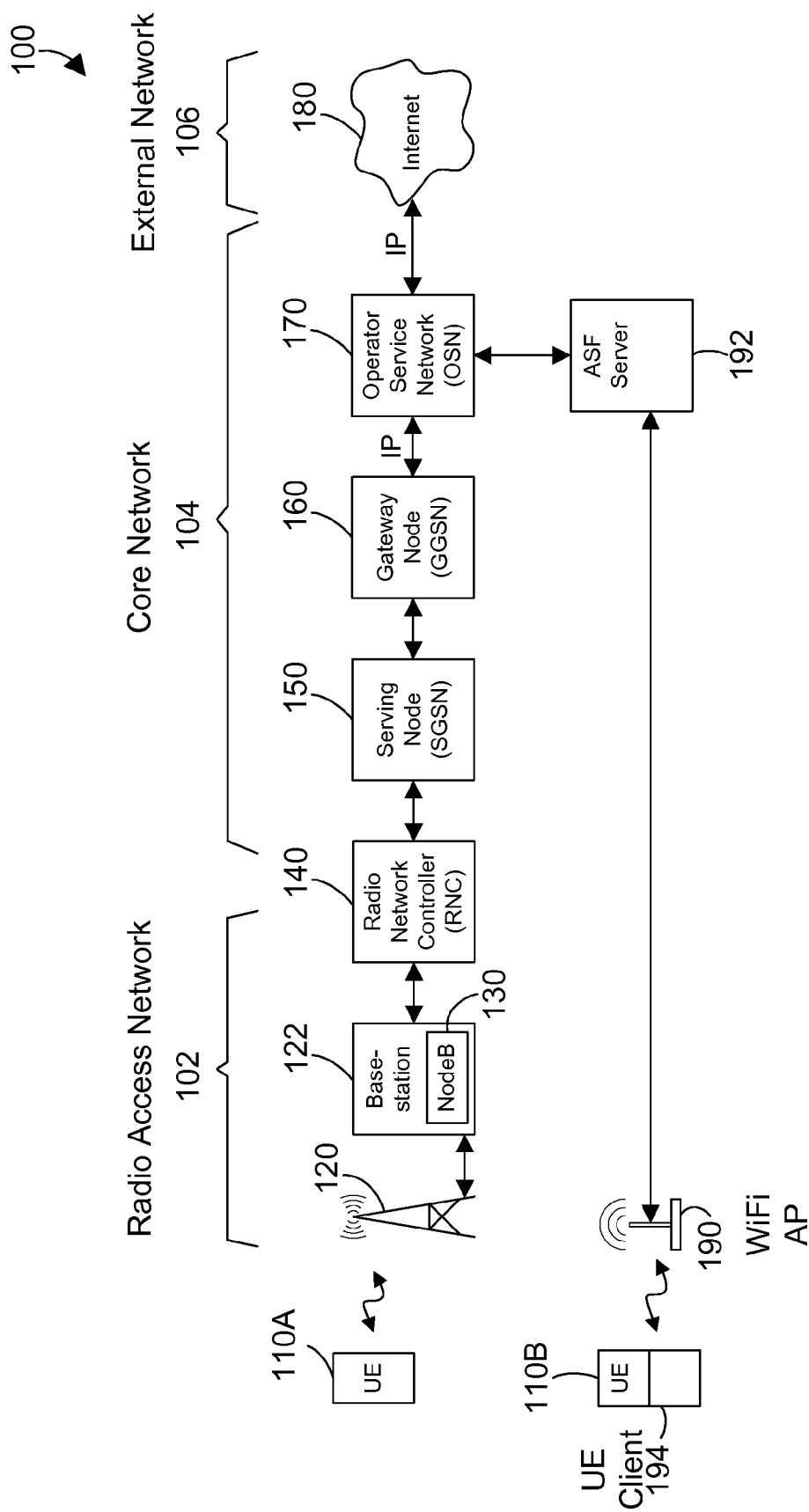

Referring to FIG. 1, a prior art mobile data network 100 is shown. Mobile data network 100 is representative of known 3G networks. The mobile data network 100 preferably includes a radio access network (RAN) 102, a mobile core network 104, and an external network 106, as shown in FIG. 1. The radio access network 102 includes the tower 120, basestation 122 with its corresponding NodeB 130, and a radio interface on a radio network controller (RNC) 140. The core network 104 includes a network interface on the radio network controller 140, serving node 150, gateway node 160 and operator service network 170 (as part of the mobile data network). The external network 106 includes any suitable network. One suitable example for an external network is the internet 180, as shown in the specific example in FIG. 1.

In mobile data network 100, user equipment 110A communicates via radio waves to a tower 120. User equipment 110A may include any device capable of connecting to a mobile data network, including a mobile phone, a tablet computer, a mobile access card coupled to a laptop computer, etc. The tower 120 communicates via network connection to a basestation 122. Each basestation 122 includes a NodeB 130, which communicates with the tower 120 and the radio network controller 140. Note there is a fan-out that is not represented in FIG. 1. Typically there are tens of thousands of towers 120. Each tower 120 typically has a corresponding base station 122 with a NodeB 130 that communicates with the tower. However, network communications with the tens of thousands of base stations 130 are performed by hundreds of radio network controllers 140. Thus, each radio network controller 140 can service many NodeBs 130 in basestations 122. There may also be other items in the network between the basestation 130 and the radio network controller 140 that are not shown in FIG. 1, such as concentrators (points of concentration) or RAN aggregators that support communications with many basestations.

The radio network controller 140 communicates with the serving node 150. In a typical 3G network, the serving node 150 is an SGSN, which is short for Service GPRS Support Node, where GPRS stands for general packet radio service. The serving node 150 mediates access to network resources on behalf of mobile subscribers and implements the packet scheduling policy between different classes of quality of service. It is also responsible for establishing the Packet Data Protocol (PDP) context with the gateway node 160 for a given subscriber session. The serving node 150 is responsible for the delivery of data packets from and to the basestations within its geographical service area. The tasks of the serving node 150 include packet routing and transfer, mobility management (attach/detach and location management), logical link management, and authentication and charging functions. The serving node 150 stores location information and user profiles of all subscribers registered with the serving node 150. Functions the serving node 150 typically performs include GPRS tunneling protocol (GTP) tunneling of packets, performing mobility management as user equipment moves from one basestation to the next, and billing user data.

In a typical 3G network, the gateway node 160 is a GGSN, which is short for gateway GPRS support node. The gateway node 160 is responsible for the interworking between the mobile core network and external networks. From the viewpoint of the external networks 180, gateway node 160 is a router to a sub-network, because the gateway node 160 "hides" the core network infrastructure from the external network. When the gateway node 160 receives data from an external network (such as internet 180) addressed to a specific subscriber, it forwards the data to the serving node 150 serving the subscriber. For inactive subscribers paging is initiated. The gateway node 160 also handles routing packets originated from the user equipment 110A to the appropriate external network. As anchor point the gateway node 160 supports the mobility of the user equipment 110A. In essence, the gateway node 160 maintains routing necessary to tunnel the network packets to the serving node 150 that services a particular user equipment 110A.

The gateway node 160 converts the packets coming from the serving node 150 into the appropriate packet data protocol (PDP) format (e.g., IP or X.25) and sends them out on the corresponding external network. In the other direction, PDP addresses of incoming data packets from the external network 180 are converted to the address of the subscriber's user equipment 110A. The readdressed packets are sent to the responsible serving node 150. For this purpose, the gateway node 160 stores the current serving node address of the subscriber and his or her profile. The gateway node 160 is responsible for IP address assignment and is the default router for the subscriber's user equipment 110A. The gateway node 160 also performs authentication, charging and subscriber policy functions. One example of a subscriber policy function is "fair use" bandwidth limiting and blocking of particular traffic types such as peer to peer traffic. Another example of a subscriber policy function is degradation to a 2G service level for a prepaid subscriber when the prepaid balance is zero.

A next hop router located in the operator service network (OSN) 170 receives messages from the gateway node 160, and routes the traffic either to the operator service network 170 or via an internet service provider (ISP) towards the internet 180. The operator service network 170 typically includes business logic that determines how the subscriber can use the mobile data network 100. The business logic that provides services to subscribers may be referred to as a "walled garden", which refers to a closed or exclusive set of services provided for subscribers, including a carrier's control over applications, content and media on user equipment.

Devices using mobile data networks often need to access an external network, such as the internet 180. As shown in FIG. 1, when a subscriber enters a request for data from the internet, that request is passed from the user equipment 110A to tower 120, to NodeB 130 in basestation 122, to radio network controller 140, to serving node 150, to gateway node 160, to operator service network 170, and to internet 180. When the requested data is delivered, the data traverses the entire network from the internet 180 to the user equipment 110A. The capabilities of known mobile data networks 100 are taxed by the ever-increasing volume of data being exchanged between user equipment 110A and the internet 180 because all data between the two have to traverse the entire network.

Various efforts have been made to offload internet traffic to reduce the backhaul on the mobile data network. FIG. 1 illustrates a service/client based architecture for a carrier or communication service provider (CSP) to offload internet traffic over WiFi to reduce the backhaul on the mobile data network. The UE 110B communicates with a WiFi access point 190 which is connected to a ASF server 192. The ASF server 192 is connected to the internet 180 through the OSN 170. The UE 110B includes a UE client 194 to communicate with the ASF server 192. The limitations of this system include no policy based billing and no support for seamless switchover with PCC (e.g. QoS) between the mobile data network and the WiFi network.

Other methods for offload include a node called a HomeNodeB that is part of the radio access network. Many homes have access to high-speed Internet, such as Direct Subscriber Line (DSL), cable television, wireless, etc. For example, in a home with a DSL connection, the HomeNodeB takes advantage of the DSL connection by routing Internet traffic to and from the user equipment directly to the DSL connection, instead of routing the Internet traffic through the mobile data network. While this may be an effective way to offload Internet traffic to reduce backhaul, the HomeNodeB architecture makes it difficult to provide many mobile network services such as lawful interception, mobility, and charging consistently with the 3G or 4G mobile data network. Another prior art method which provides a carrier with a standardized architecture for $3^{rd}$ Generation Partnership Project (3GPP) based WiFi Offload is illustrated in the 3GPP Technical Specification 23.402 Architecture Enhancements for Non 3GPP accesses (Release 11). This architecture is similar to FIG. 1 but uses a clientless WiFi access gateway in the place of the client based ASF server.

Figure 2:
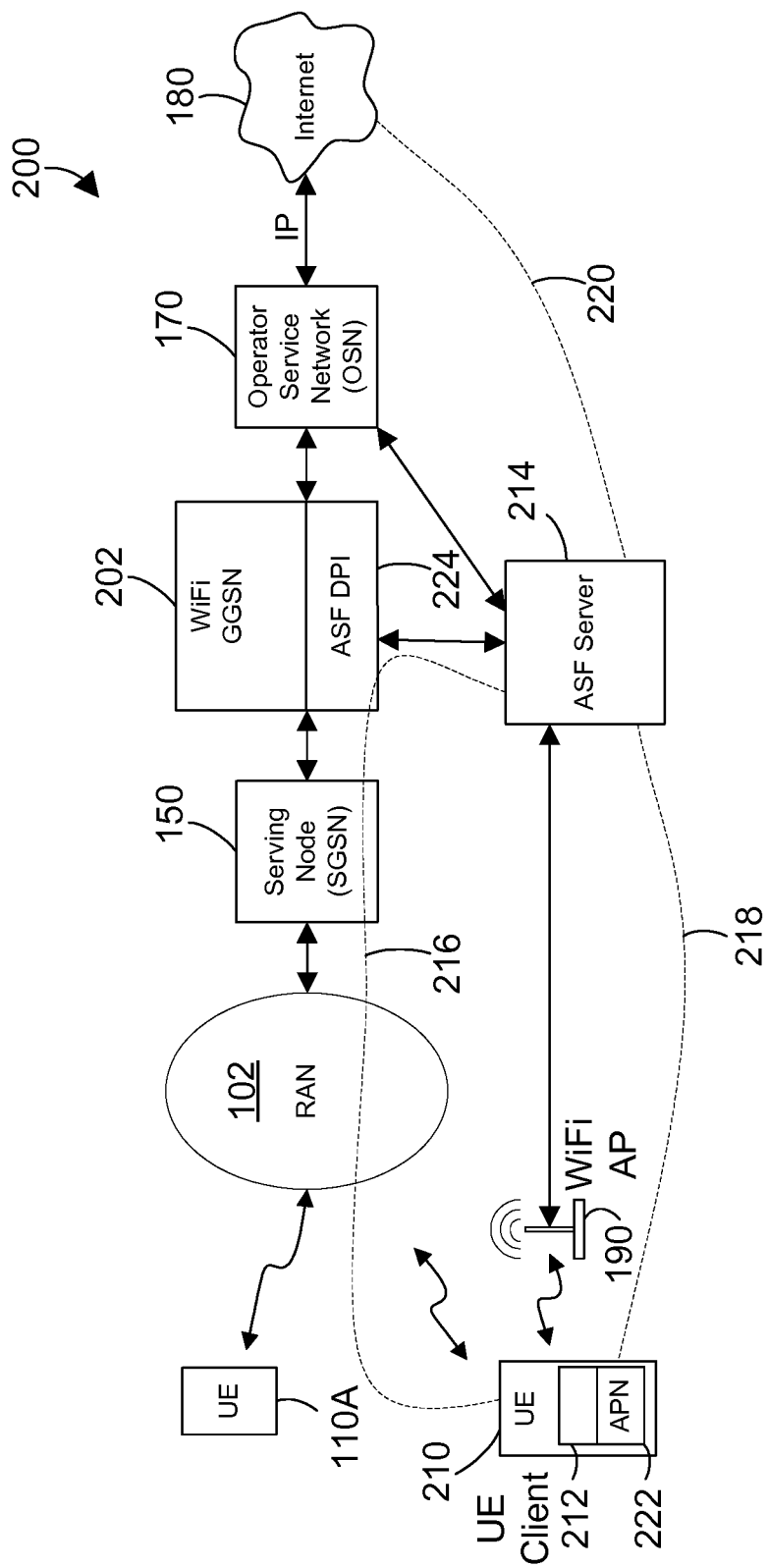

FIG. 2 illustrates a block diagram of a mobile data system 200 that provides service awareness and seamless switchover of user device (UE) between a mobile data network and a wireless network. The mobile data system 200 has many of the same elements as the prior art mobile data system 100 and uses the same item numbers for common elements. As in the prior art, a UE 100A communicates with a RAN 102, where the RAN 102 in this figure is simplified to a single element. The RAN 102 is connected to a SGSN 150. The SGSN 150 is connected to a modified GGSN that is referred to herein as a WiFi GGSN 202. The WiFi GGSN 202 is connected to the OSN 170 and the internet 180. The WiFi GGSN 202 is described further below. A UE 210 has a UE client 212 that communicates with a hot spot or WiFi access point 190. The WiFi access point 190 is connected to an auto switching function (ASF) server 214. The ASF server 214 is connected to the WiFi GGSN 160 and the OSN 170.

FIG. 2 illustrates service awareness and seamless switchover between a mobile data network and a wireless network. The UE 210 performs a setup communication over the mobile data network with the RAN 102 to start network communications. The setup communication is used to create a PDP context and ASF tunnel 216. The ASF tunnel 216 is a GPRS Tunneling Protocol User Plane (GTP-U) based connection extending from the UE client 210 up to the ASF server 212. The setup communication is described further below with reference to FIG. 4. The UE client also sets up a WiFi tunnel 218 from the UE 210 to the ASF server 212 through the WiFi AP 190 over the wireless network. With these two tunnels set up, the ASF server 214 can seamlessly switch data between the mobile data network and the wireless network to communicate 220 to the internet 180. The ASF server and the UE client together determine whether to use the ASF tunnel (GTP U included) 216 or the WiFi tunnel 218. The ASF server may send to the UE client a command like 'now use the 3G tunnel' and upon receiving this command the UE client would use the port associated with the 3G connection of the mobile network. Upon the specified APN the mobile data core network entity can recognize and process this ASF related traffic and apply policies, for example, maintain the QoS parameter of the session.

In the setup communication introduced above, the UE client 212 uses a special access point name (APN) 222 when creating the PDP session. The special APN 222 can be used by the SGSN 150 to route the ASF server traffic to a specific GGSN ('WiFi GGSN') that is connected to the ASF server. The ASF server traffic is proprietary and therefore not understood by a normal GGSN. The WiFi GGSN uses a dedicated ASF deep packet inspection (ASF DPI) 224 for all data transfers to the special APN to monitor the ASF traffic. The mobile data core network component is then able to monitor the UE data traffic as the traffic is toggled between the ASF tunnel and the WiFi tunnel. By using DPI on all data traffic on the ASF tunnel using the special APN, the mobile data core component (GGSN/PGW) is able to provide PCC for the data session as the UE moves from the WiFi network to the mobile data network to become "service aware". It is important to note that there can be many GGSNs in the mobile data network even though only a single GGSN 160 is shown in the figures. Using the special APN thus allows WiFi GGSN boxes to be added to the mobile data network to support the ASF server while allowing the existing GGSN boxes in the system to remain unchanged. Alternatively existing GGSN boxes can be upgraded and reconfigured as described herein.

Figure 3:
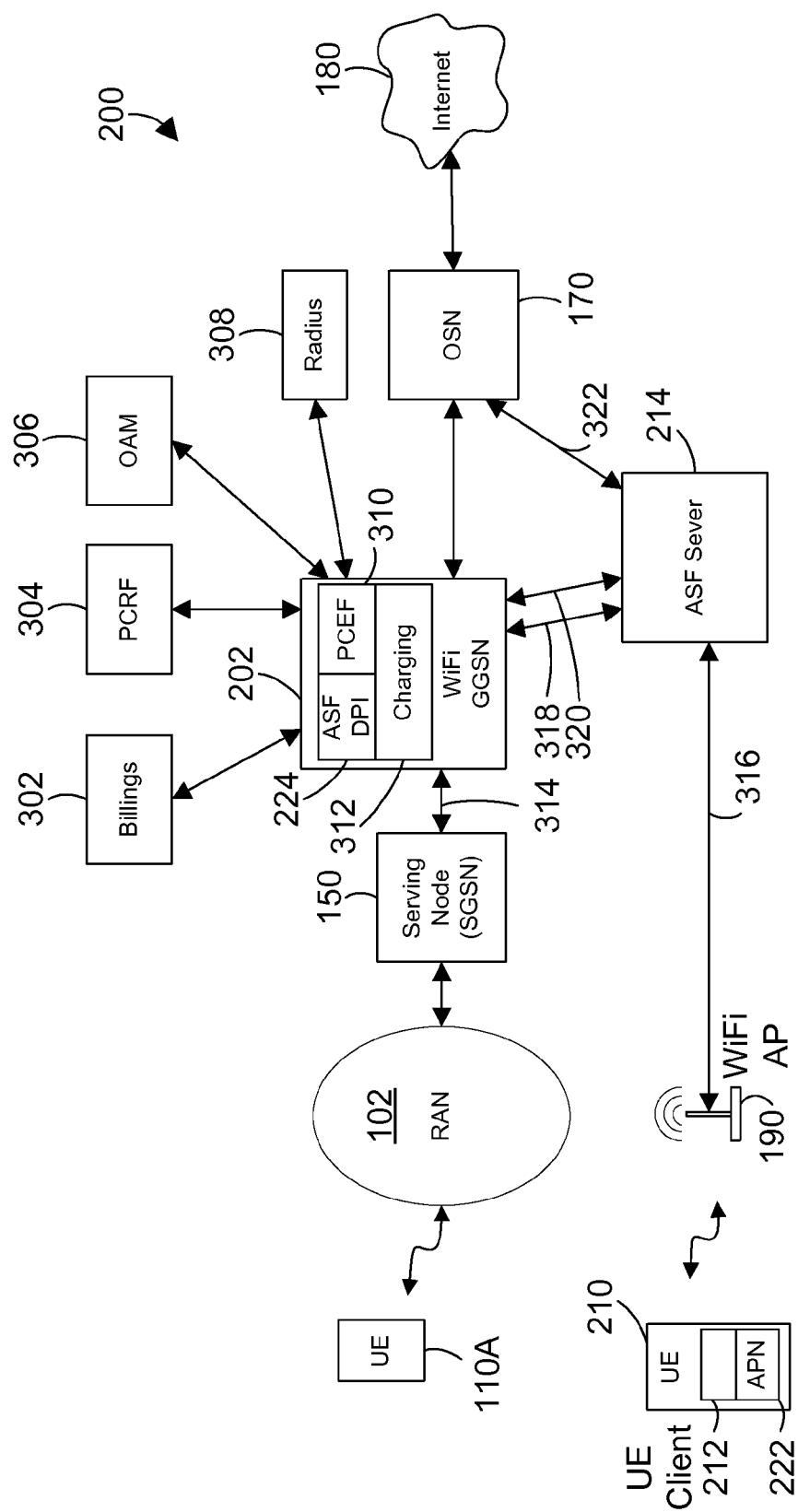

FIG. 3 is a block diagram which illustrates additional details of the mobile data network with seamless switchover introduced in FIG. 2. The WiFi GGSN 202 connects to a billings function 302, a policy and charging rules function (PCRF) 304, an operation and maintenance (OAM) function 306 and a remote authentication dial in user service (Radius) server 308. Internally, the WiFi GGSN 202 includes an ASF deep packet inspection (DPI) function 224, a policy and charging enforcement function (PCEF) 310 and a charging function 312. The WiFi GGSN interfaces to an Online Charging System (OCS) and a Charging Gateway Function (CGF) in the billing function 302, and a Policy Control Resource Function (PCRF) 304 in the manner known in the prior art. In addition, the WiFi GGSN 202 includes other functions of a typical GGSN known in the prior art.

Again referring to FIG. 3 we will now consider some of the interface connections to the WiFi GGSN 202 and the ASF server 214. The WiFi GGSN 202 is connected to the SGSN 150 on a standard 3GPP Gn interface 314. The Gn interface 314 carries signaling and non-ASF traffic according to the prior art, and ASF traffic as described herein. The WiFi GGSN is connected to the billings function 302, the policy and charging rules function (PCRF) 304, the operation and maintenance (OAM) function 306, the Radius server 308, and the OSN 170 in the normal manner. The WiFi AP to ASF interface 316 is similar to the prior art and contains the UE data traffic that is routed to the ASF server 214. The ASF server 214 is connected to the WiFi GGSN 202 with a lightweight authentication, authorization, and accounting (AAA) interface 318 and a Gi interface 320. The ASF sever 214 receives start/stop accounting messages over the lightweight AAA interface 318. The Gi interface 320 carries ASF traffic between the ASF server 214 and the WiFi GGSN 202. The ASF sever 214 routes UE traffic to the OSN/internet over the Gi interface 322.

The WiFi GGSN 202 interfaces to the PCRF 304 for policy rule control and enforcement interaction. The PCRF 304 is used by the network operator to control the behavior of the network as in the prior art. The PCRF 304 can also include new policies and rules as described herein for data detected by the ASF DPI 224. The enforcement can influence the PDP context (QoS/context modification). Generally, policies can be global, time based, regionally based, service or application based, subscriber based, based on PDP context, protocol based, layer level specific, or a combination of these.

The WiFi GGSN and the ASF server store information to correlate data flows or enforce policies. The WiFi GGSN may store the following information: PDP context session data (Tunnel Endpoint Identifier (TEID)), SGSN address, APN, UE IP address, QoS), subscriber data (International Mobile Subscriber Identifier (IMSI)), Mobile Station International Subscriber Directory Number (MSISDN), and ASF context information (ASF virtual IP address). Further the ASF server may store the following information: ASF context (ASF virtual IP address, UE IP address), subscriber data (IMSI, MSISDN), Radio Access Type (RAT)=2G/3G/4G or WiFi, and location area code (LAC) of the ASF client on UE.

The use of the above parameters stored by the WiFi GGSN and the ASF sever may be implementation and integration specific, and depend on the operators network requirements. Storage of the above parameters may be used to implement specific policies related to the data traffic on the ASF tunnel. For example, by storing the Radio Access Type, a policy could be implemented to perform ASF server switching to a WiFi connection only for 3G networks and not for 2G networks. This can be implemented globally (for all subscribers using ASF, within a region or outside busy hours) or subscriber specific (based on subscription). For a subscriber specific policy, the WiFi GGSN receives the subscriber specific policy from the PCRF and triggers the ASF to implement the desired behavior for the specific subscriber. The ASF would apply that policy on the associated ASF virtual IP address that represents the subscriber.

In another example of implementing specific policies, the MSISDN can be added into an HTTP header field in an IP packet (sometimes known as header enrichment). With the MISIDN in the header field, a specific application in the internet or OSN can correlate IP traffic with the subscriber. This could be done to provide a service such as adult content filtering. In this example the policy is a global function, which provides processing functions to correlate subscribers with service calls. At the OSN/Internet end of the communication, only the ASF IP address will be visible and not the GGSN or WiFi AP IP address. The stored ASF virtual IP address may be used to implement this type and other types of policies. In this case, the ASF server can associate an ASF virtual IP address with a MSISDN to identify IP packets with the MSISDN in the header field that meet the criteria of the policy.

The Radius server needs to be updated with subscriber information for charging. One possible implementation to update the Radius server is whenever a PDP context with the special APN is created. The IP address of the UE visible to the internet is the ASF virtual IP address assigned by the ASF server (different than the UE IP address assigned by the WiFi GGSN). The WiFi GGSN needs to send the information about this ASF virtual IP address together with the MSISDN to the Radius server of the OSN (Radius Start Account Request). It is assumed that the Radius server of the OSN is able to handle for the same subscriber and PDP context more than one IP address in parallel.

The WiFi GGSN 202 supports the handling and routing of the traffic using the dedicated APN. The WiFi GGSN 202 acts as a normal GGSN for other APN and routes this traffic directly to the OSN. Normally an IP address allocated by a GGSN to UE is different from the IP address allocated by a WiFi AP. In this case with an ASF tunnel constructed between the UE and ASF server 202 through the WiFi GGSN, the UE will be allocated a virtual IP address by ASF server, and the virtual IP address will be kept the same even while UE's physical IP address is changed because of switching from mobile network to WLAN. On switching the subscriber packets on the UE connection, the PDP/IP session will be kept the same. Session persistence should be supported by the ASF server 214. In the case where UE traffic arrives via WiFi access, the traffic flow is as follows: UE←WiFi-AP←AFS Server←OSN←Internet.

In 3GPP based mobile networks, it is necessary to support offline charging and online charging. Historically this has been done with volume and time based charging that did not require inspection of IP traffic. According to the newest rule and flow based billing architectures of the recent 3GPP standards, the IP traffic needs to be inspected. With IP data traffic flowing through the ASF tunnel as described herein, the rule and flow based charging methods cannot capture this ASF data traffic. By using the ASF DPI function 224, the WiFi GGSN is able to support rule and flow based billing for data flowing in the ASF tunnel using the special ASF APN. As introduced above, deep packet inspection is done by the ASF DPI function 224. Thus, for the ASF related user traffic, after GTP-U decapsulation the ASF DPI function 224 is able to detect and understand a broad variety of layer 3 to layer 7 of the 3GPP protocols for further processing (3GPP content awareness) in the manner known in the prior art. In contrast to the prior art, for ASF traffic, the ASF DPI function 224 handles and understands the ASF server's tunnel protocol. The ASF DPI function 224 detects the application protocols of the ASF tunneled content from layer 3 to 7 similar to the prior art DPI function. It can be assumed that all traffic via the dedicated ASF APN belongs to ASF tunneled connections only. For non ASF related user traffic using other APNs, the prior art DPI function (not shown) performs the required actions.

There are at least two possible methods to connect the ASF server into the mobile data network with a WiFi GGSN. First it is possible to have a loosely coupled solution between the new WiFi GGSN and the ASF server with all interactions as external interfaces. In this method the WiFi GGSN sees the ASF server like a second OSN on the Gi interface. The second method is an integrated solution. In the integrated solution the AFS server becomes part of the WiFi GGSN internal flow. In this method the ASF server would look similar to a virtual private network (VPN) termination point inside the WiFi GGSN for the ASF traffic. The description herein is limited to the first method but the claims herein expressly cover the integrated method as well.

A fixed IP address for the ASF Server is supplied from the UE client for routing purposes. Upon communication setup (PDP Context Activation as described below) the ASF Server generates an ASF virtual IP address. The ASF server uses network address translation (NATing) with the ASF virtual IP address for data sent to/from the internet or OSN. In the setup communication an IP address is also allocated by the GGSN, which is different from the IP address allocated by Access Point (AP) to the UE. Therefore, when the ASF tunnel is built up between UE and ASF server, the UE will be allocated to the ASF virtual IP address towards the OSN/internet by the ASF server and this virtual IP address will be retained even if the UE's physical IP address is toggled because of switching from the mobile network tunnel to the WiFi tunnel connection. The IP sessions are maintained so that the subscriber can be switched back and forth between the tunnels while providing service aware policy and charging control (PCC) of the data session in the mobile data network.

Figure 4:
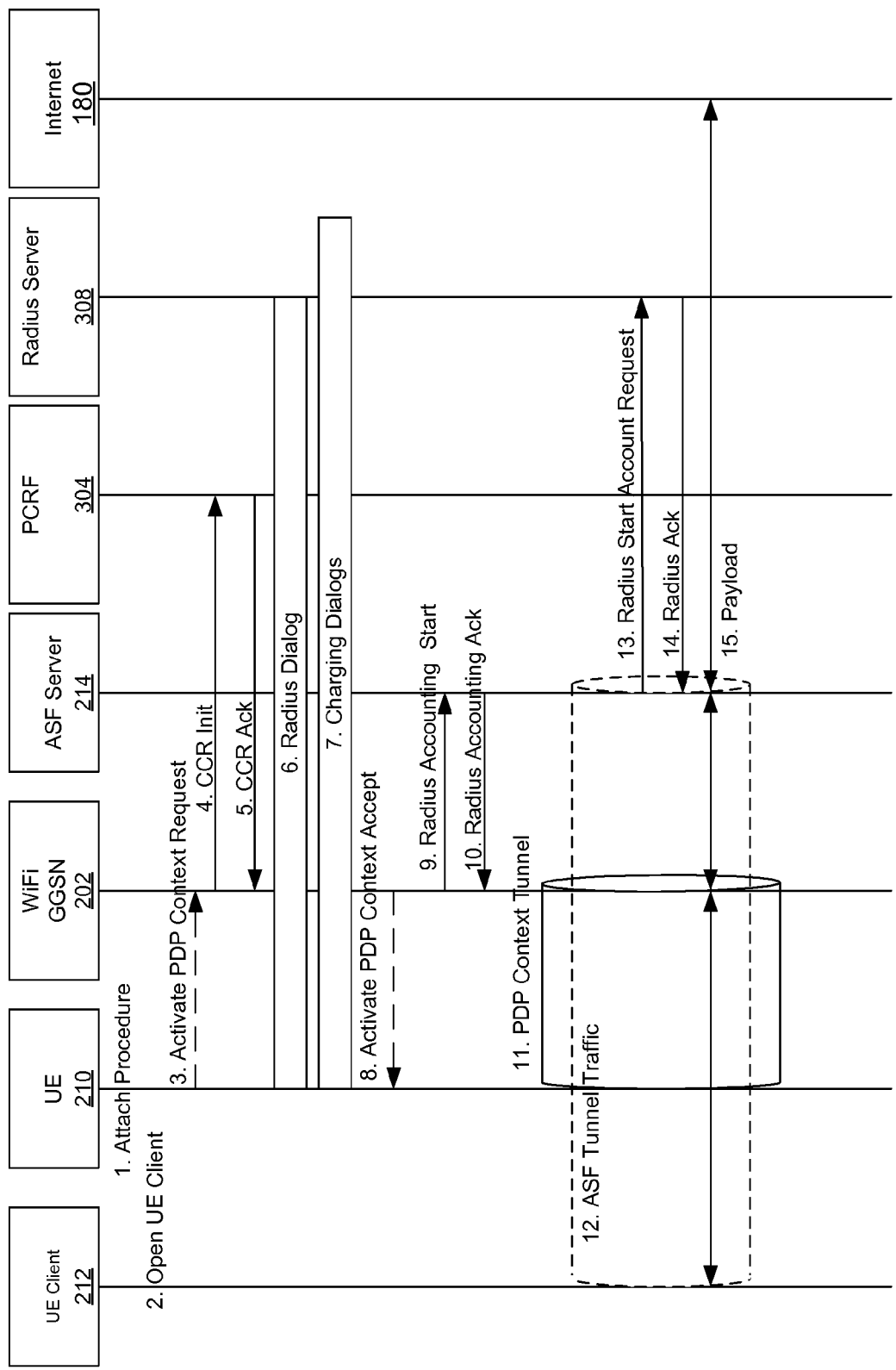

FIG. 4 is a flow diagram that illustrates the setup communication for a first packet of data to setup for switchover as described above. The entities that are the source and destination of the data and control are shown at the top of the chart. These entities are the same entities shown in FIG. 3. The entities include: user equipment (UE) client 212, UE 210, WiFi GGSN 202, ASF server 214, PCRF 304, Radius server 308 and internet 180. The method herein uses flows and interfaces with the Online Charging System (OCS), Charging Gateway Function (CGF) and the Policy Control Resource Function (PCRF) in the manner know in the prior art. The setup flow begins with an attach procedure initiated by the UE in the manner known in the prior art (step 1). The UE 210 also opens the UE client 212 (step 2). After being attached to the mobile network, the UE sends an Activate PDP Context Request to the WiFi GGSN using the special APN described above (step 3). The WiFi GGSN then sends a CCR Init message (step 4) and waits for a CCR Ack message from the PCRF (step 5). Radius dialogs are then triggered from the UE and executed between the WiFi GGSN and the Radius server 308 (step 6). Charging dialogs are also triggered from the UE executed between the WiFi GGSN and an Online Charging System (OCS) located in the billings function 302 (FIG. 3) (step 7). The Radius dialogs and the charging dialogs are done as in the prior art to set up subscriber services with the Radius server. The WiFi GGSN 202 sends an Activate PDP Context Accept message to the UE (step 8). The WiFi GGSN then sends a Radius Accounting Start message which is copied to the ASF server (step 9) and the ASF server sends a Radius Accounting Ack message back to the WiFi GGSN (step 10). At this point a PDP context is established between the UE and the WiFi GGSN (step 11). Inside the PDP context, the UE client and the ASF send ASF tunnel traffic (step 12). The ASF server sends a Radius Start Account Request message to the Radius sever (step 13) and the Radius server sends a Radius Ack messages back to the ASF server (step 14). The messages of step 9 and step 13 together synchronize the IP packet flow between the WiFi GGSN and the ASF server and the WiFi GGSN and the Radius server. For example, if the subscriber has used up his quota the mobile session can be terminated. The ASF tunnel traffic includes pay load data sent using the proprietary data format of the ASF server (step 15).

Figure 5:
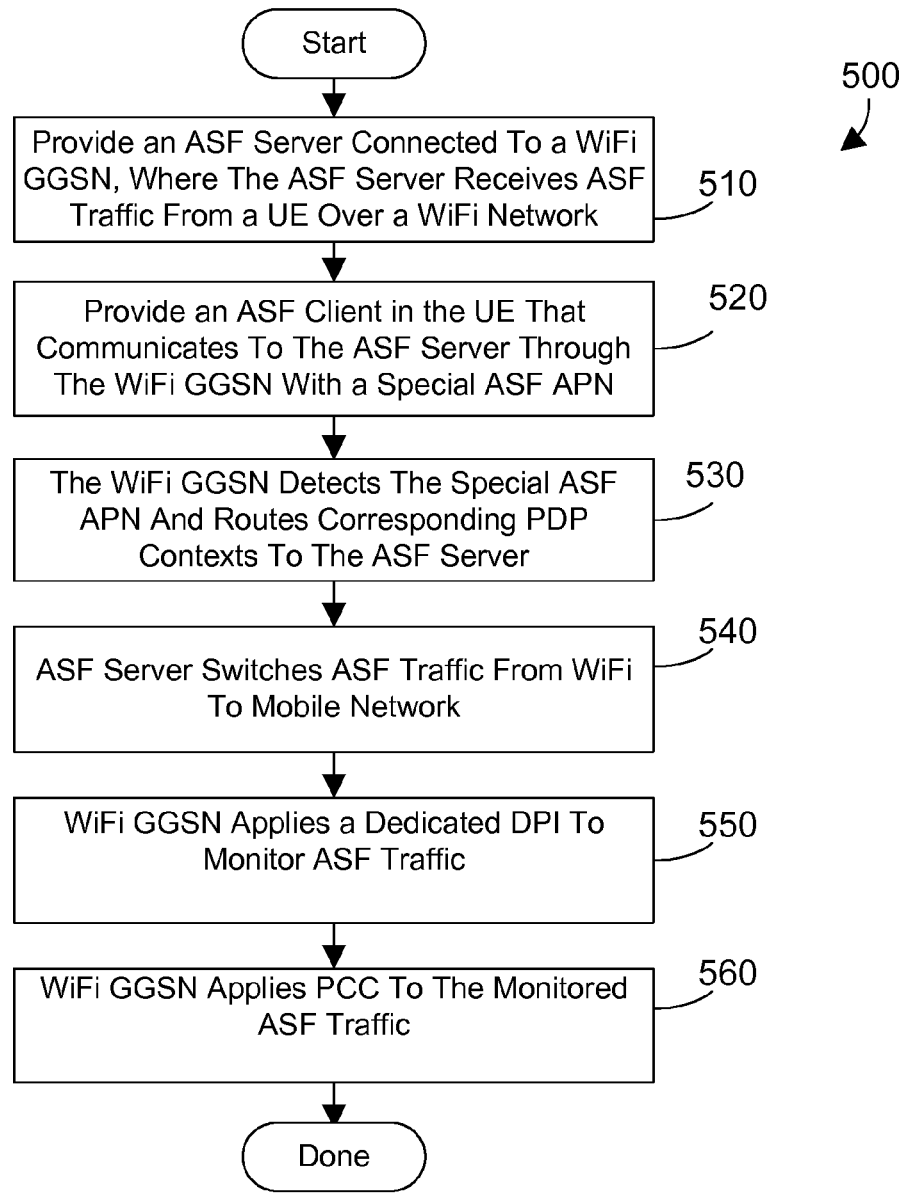

FIG. 5 is a flow diagram of a method 500 for service awareness and seamless switchover in a mobile data network. The method begins by providing an ASF server connected to a WiFi GGSN where the ASF server receives ASF traffic from a UE over a WiFi network (step 510). Next, an ASF client in the UE that communicates to the ASF server through the WiFi GGSN with a special ASF APN is provided (step 520). The WiFi GGSN detects the special ASF APN and routes corresponding PDP contexts to the ASF server (step 530). The ASF sever switches ASF traffic from WiFi network to the mobile data network to communicate between the ASF server and the UE Client (step 540). The WiFi GGSN applies a dedicated DPI to monitor the ASF traffic at the WiFi GGSN (step 550). The WiFi GGSN applies PCC to the monitored ASF traffic to provide service aware and seamless switching (step 560). The method is then done.

While the mobile data network 200 in FIG. 2 and FIG. 3 and described herein is in the context of a 3G mobile data network, the disclosure and claims herein expressly extend to other networks as well, including Long Term Evolution (LTE) networks, flat RAN networks, code division multiple access (CDMA) networks, and other networks developed in the future.

Figure 6:
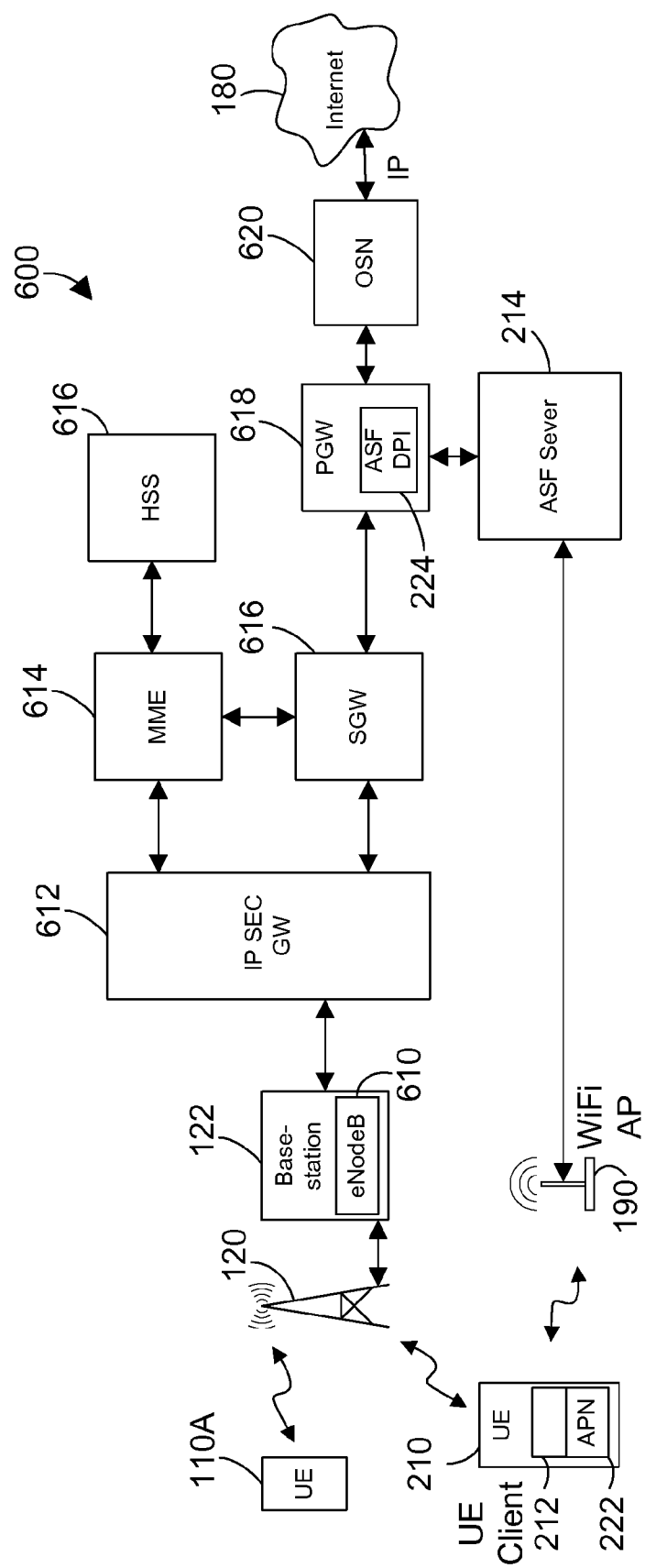

FIG. 6 is a block diagram of an LTE/4G mobile data network 600 that provides seamless switchover of a UE between a mobile data network and a wireless network. Mobile data network 600 is representative of known flat mobile data networks (such as 3GPP LTE, LTE Advanced, and 4G). The mobile data network 600 preferably includes a radio access network (RAN), a core network, and an external network similar to the 2G/3G network shown in FIG. 1. The radio access network includes the tower 120, basestation 122 with a corresponding eNodeB 610, and a radio interface on an Internet Protocol Security gateway (IP SEC GW) 612. The core network includes the IP SEC GW 612, a mobility management entity (MME) 614, a serving gateway (SGW) 616, a home subscriber server (HSS) 616, a public data network gateway (PDN gateway or PGW) 618 and an operator service network (OSN) 620 (as part of the mobile data network). These components in the core network together are sometimes referred to as the evolved packet core (EPC). The EPC serves as the equivalent of the general packet radio service (GPRS) network in 3G networks. The external network includes any suitable network such as the internet 180. The LTE mobile data network 600 includes a UE 210 with a UE client 212 and ASF APN 222 as described above. Further, the LTE mobile data network 600 includes a ASF server 214 connected to the PGW 618 with an ASF DPI 224. These entities function as described in detail above for the 2G/3G mobile data network. The UE client 212 sets up a tunnel over the mobile data network through the IP SEC GW 612, the SGW 616 to the PGW 618. Similarly to above, the UE client 212 also sets up a GTP-U based data tunnel through the WiFi AP 190 to the ASF server 214. In contrast to the above example, in the LTE mobile data network 600 the ASF DPI 224 is done in the PGW 618.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, Streams Processing language, or similar programming languages. Java is a registered trademark of Oracle America, Inc. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods disclosed herein may be performed as part of providing a web-based service. Such a service could include, for example, offering the method to online users in exchange for payment. In addition, the service could be divided among various different service providers. For example, multiple providers of mobile data networks could each provide different pieces of the mobile data network disclosed herein that cooperate together to provide the functions disclosed herein.

The disclosure and claims are directed to a system and method for providing seamless switchover of user equipment (UE) between a mobile data network and a wireless network while providing policy and charging control (PCC) of the data session in the mobile data network. A core network component processes user data traffic related to an auto switching function (ASF) server from a UE client located on the UE using a special access point name (APN). The core network component then uses a dedicated deep packet inspection (DPI) for all data transfers to the special APN. The core network component is then able to process the UE data traffic seamlessly as the traffic is toggled between an ASF tunnel and a WiFi tunnel. By monitoring the data traffic on the ASF tunnel, the core component (GGSN/PGW) is able to provide PCC for the data session as the UE moves from the WiFi network to the mobile data network.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, the disclosure and claims herein expressly extend to any suitable networks, including 3G networks, Long Term Evolution (LTE) networks, flat RAN networks, and code division multiple access (CDMA) networks.

The invention claimed is:

1. A method for providing service awareness to auto switching function (ASF) data traffic in a mobile data network, the method comprising steps of:
   providing an ASF server connected to a core network component of a core network of the mobile data network, wherein the ASF server is also connected to a wireless access point that receives wireless communications with a user equipment (UE) and the wireless access point communicates ASF data traffic from the UE on a wireless tunnel;
   providing an ASF client in the UE that communicates with the ASF server through the core network component using a special ASF access point name (APN) on an ASF tunnel;
   the core network component detecting the special ASF APN and routing corresponding data traffic to the ASF server;
   the core network component applying a dedicated deep packet inspection to the ASF tunnel to identify all data traffic having the special ASF APN on the ASF tunnel;
   and in response to applying the dedicated deep packet inspection to the ASF tunnel, the core network component applying policy and charging control to all data traffic identified as having the special ASF APN.

2. The method of claim 1 further comprising a step of the ASF server switching ASF data traffic from the wireless tunnel to the ASF tunnel.

3. The method of claim 1 wherein the core network component is a gateway GPRS (general packet radio service) support node (GGSN).

4. The method of claim 1 wherein the core network component is a packet data network gateway (PGW) in a long term evolution (LTE) mobile data network.

5. The method of claim 1 further comprising a step of the ASF server and the ASF client together determining whether to use the ASF tunnel or the wireless tunnel to send data from the UE to the ASF server.

6. The method of claim 1 further comprising a step of the ASF client processing data traffic to the ASF server seamlessly with service awareness as the data traffic is toggled between the ASF tunnel and the wireless tunnel.

7. The method of claim 1 further comprising a step of the ASF sever storing ASF context information including an ASF virtual internet protocol (IP) address to enforce one or more policies.

8. The method of claim 1 wherein the ASF server further stores information comprising UE internet protocol address, subscriber data (an International Mobile Subscriber Identifier (IMSI)), and a Mobile Station International Subscriber Directory Number (MSISDN), Radio Access Type (RAT) and location area code (LAC) of the ASF client on the UE.

9. The method of claim 1 wherein the ASF tunnel is a general packet radio service (GPRS) tunneling protocol user plane (GTP-U) tunnel carrying ASF server data traffic.

10. A method for providing service awareness to ASF data traffic a mobile data network, the method comprising the steps of:
- providing an auto switching function (ASF) server connected to a wireless gateway general packet radio service support node (WiFi GGSN) of a core network of the mobile data network, wherein the ASF server is also connected to a wireless access point that receives wireless communications with a user equipment (UE) and the wireless access point communicates ASF data traffic from the UE on a wireless tunnel;
- providing an ASF client in the UE that communicates with the ASF server through the WiFi GGSN using a special ASF access point name (APN) on an ASF tunnel;
- the WiFi GGSN detecting the special ASF APN and routing corresponding data traffic to the ASF server;
- the ASF server switching ASF data traffic from the wireless tunnel to the ASF tunnel;
- the WiFi GGSN applying a dedicated deep packet inspection to the ASF tunnel to identify all data traffic having the special ASF APN on the ASF tunnel;
- in response to applying the dedicated deep packet inspection to the ASF tunnel, the WiFi GGSN applying policy and charging control to all data traffic identified as having the special ASF APN; and
- the ASF sever storing ASF context information including an ASF virtual internet protocol (IP) address to enforce one or more policies.

\* \* \* \* \*